US006405215B1

(12) United States Patent
Yaung

(10) Patent No.: US 6,405,215 B1
(45) Date of Patent: Jun. 11, 2002

(54) WORKFLOW AGENT FOR A MULTIMEDIA DATABASE SYSTEM

(75) Inventor: Alan Tsu-I Yaung, San Jose, CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/377,278

(22) Filed: Aug. 19, 1999

Related U.S. Application Data

(60) Provisional application No. 60/107,394, filed on Nov. 6, 1998.

(51) Int. Cl.[7] .............................................. G06F 17/30
(52) U.S. Cl. ................................... 707/104.1; 707/102
(58) Field of Search ....................... 707/6, 102, 104.1; 709/226; 717/1

(56) References Cited

U.S. PATENT DOCUMENTS

| | | | |
|---|---|---|---|
| 5,301,320 A | 4/1994 | McAtee et al. ................ | 705/9 |
| 5,535,322 A | 7/1996 | Hecht ............................. | 705/1 |
| 5,581,691 A | 12/1996 | Hsu et al. ..................... | 714/15 |
| 5,596,750 A | 1/1997 | Li et al. ....................... | 709/101 |
| 5,745,687 A | 4/1998 | Randell ....................... | 709/201 |
| 5,768,506 A | 6/1998 | Randell ....................... | 709/202 |
| 5,790,789 A | 8/1998 | Suarez ........................ | 709/202 |
| 5,848,271 A | 12/1998 | Caruso et al. ............... | 712/220 |
| 6,256,773 B1 * | 7/2001 | Bowman-Amuah ............ | 707/1 |
| 6,289,382 B1 * | 9/2001 | Bowman-Amuah ......... | 709/226 |

FOREIGN PATENT DOCUMENTS

| | | |
|---|---|---|
| EP | 0 854 431 A2 | 7/1998 |
| JP | 07-182412 | 7/1995 |
| WO | WO 96/25012 | 8/1996 |
| WO | WO 98/01807 | 1/1998 |

OTHER PUBLICATIONS

Tjoa, AM, et al., "Topics List", Proceedings Ninth International Workshop on Database and Expert Systems Applications (Cat. No. 98EX130), IEEE Comput. Soc., Vienna, Austria, Aug. 26–28, 1998.

Cugola, G., et al., "Exploiting an Event–Based Infrastructure to Develop Complex Distributed Systems", Proceedings of the International Conference on Software Engineering, Kyoto, Japan, IEEE Comput. Soc., Apr. 19–25, 1998.

Tarumi, H., et al., "Dynamic Replanning of Workflow by an Agent System", Transactions of the Information Processing Society of Japan, vol. 39, No. 7, Jul. 1998.

IBM Corporation Technical Disclosure Bulletin, "Implementing Workflow Using Personal Organizers", vol. 41, No. 01, p. 45, Jan. 1998.

IBM Corporation Research Disclosure "Context Support for Program Activity Implementations of Workflow Management Systems", Document No. 410149, pp. 838–839, Jun. 1998.

IBM Corporation Research Disclosure, "Method For Testing Program Activity Implementations of Workflow Management Systems", Document No. 408186, pp. 503–505, Apr. 1998.

IBM Corporation Research Disclosure, "Audit Trail Support For Program Activity Implementations of Workflow Management Systems", Document No. 40792, pp. 309–310, Mar. 1998.

* cited by examiner

*Primary Examiner*—Diane D. Mizrahi
(74) *Attorney, Agent, or Firm*—Sughrue Mion, PLLC

(57) ABSTRACT

A method, apparatus, and article of manufacture for a computer-implemented workflow agent. Items stored in a data store connected to a computer are tracked in the computer. Initially, a workflow agent is invoked Under control of the workflow agent, an item in the multi-media data store is monitored to determine whether the item meets one or more specified conditions. When the monitoring indicates that the item meets the one or more specified conditions, under control of the workflow agent, whether an action is to be performed is determined. When it is determined that an action is to be performed, the action is performed.

33 Claims, 14 Drawing Sheets

```
test.cmd rem workflow agent cluster
rem
rem ItemID = R34V@PRUF#HELH#H
rem
rem #define DK_ITEMS_NOT_IN_WORKFLOW          1
rem #define DK_CURRENT_WORKFLOW_ITEMS          2    /* set by start wf */
rem #define DK_COMPLETED_WORKFLOW_ITEMS        4    /* set by exp time util
                                                      */
rem #define DK_CANCELLED_WORKFLOW_ITEMS        8    /* set by remove wf */
rem #define DK_FINISHED_WORKFLOW_ITEMS        16    /* set by complete wf
                                                      */
rem #define DK_ITEMS_SUSPENDED                32
rem #define DK_ITEMS_NOT_SUSPENDED            64
rem #define DK_WIP_ALL                       128 rem
rem start wfagent -i "R34V@PRLTF#HELH#" -w 2 -v 5000 -d 5000 -a
"E:\Netscape\Communicator\
         Program\netscape.exe ayaung.stl.ibm.com"     7
e:\ldlv2OO\c\samples\nt\wfagent\release\wfagent -t 1 -i "R34V@PRUF#HELH#" -w 2 -v
5000 -d 5000
rem
start e:\ldlv2OO\c\samples\nt\wfagent\release\wfagent -i "R34V@PRUF#HELH#H" -w 16 -v
5000 -a
"\"C:\Program Files\Netscape\Communicator\Program\netscape.exe\" www.yahoo.com" -t 1
```

FIG. 8

WFAgent.cpp

```cpp
//****************************************************************************/
// Filename :      WFAgent.CPP/MAK
// Description :   Workflow Agent

//****************************************************************************/ include <iostream.h>
include <DKWorkFlowServiceDL.hpp>
#include <DKException.hpp>
include <DKDDO.hpp>                                              900 define flagNo 11
    int mask[flagNo];
    int result [flagNo];

void main (int argc, char *argv[ ])
{
  try {
    DKDatastoreDL dsDL;
    DKAny input _option = DK_SS_CONFIG;
    DKAny output _option;
    DKWorkflowServiceDL wfDL (&dsDL);
    DKWorkManagementInfoDL* item = 0;

int i = 0;
    int count = argc;
    int type = 0;

char itemID[17];            // -i
    int  suspension;            // -s
    int  wip;                   // -w
    int  release;               // -r
    int  priority;              // -p
    char wfID[17];              // -f
    char wbID[17];              // -b int  delay = 0;             // -d
    int  wait = 0;              // -t
    int  interval = 0;          // -v
    char action[256];           // -a
    char buffer[256];
```

FIG. 9A

```
dsDL.setOption (DK_OPT_DL_ACCESS,  input_option);
dsDL.getOption (DK_OPT_DL_ACCESS,  output_option);
dsDL.connect ("lsmufasa", "FRNADMIN",    "PASSWORD");
for (i = 0;    i < flagNo; i++)
{
    mask[i] = 0;
    result[i] = 0;
} if (strcmp(argv[1], "-h") == 0)
{
    cout <<   "-h  help " << endl;
    cout <<   "-i  itemID " << endl;
    cout <<   "-s  suspension " << endl;
    cout <<   "-w wip " <<endl;
    cout <<   "-r  release " << endl;
    cout <<   "-p  priority " << endl;
    cout <<   "-f  workflowID " << endl;
    cout <<   "-b  workbasketID " << endl;
    cout <<   "-d  delay " << endl;
    cout <<   "-t  wait " << endl;
    cout <<   "-v  interval " << endl;
    cout <<   "-a  action " << endl;
    return;
} if (count%2  == 0)
{
    cout <<  "Incorrect parameter numbers." <<endl;
     return;
} for (i = 1;  i <=  (count-1);  i+=2
{
    type = -1;

if (strcmp(argv[i], "-i")  == 0)
    {
            type = 0;
            mask[0] = 1;
            result[0]  = 1;
            strcpy((char*)itemID, argv[i+1]);
            cout <<  "itemID = " << itemID << endl;
    }
    else if (strcmp(argv[i], "-s",) == 0)
    { type = 1;
            mask[1] = 1;
```

*FIG. 9B*

```
            suspension = atoi(argv[i+ l]);
            cout << "suspension = " << suspension << endl;
    }
    else if (strcmp(argv[i], "-w") == 0)
    {
            type = 2;
            mask[2] = 1;
            wip = atoi(argv[i+l]);
            cout << "wip = " << wip << endl;
    }
    else if (strcmp(argv[i], "-r") == 0)
    {
            type = 3;
            mask[3] = 1;
            release = atoi(argv[i+1]);
            cout << "release = " << release << endl;
    }
    else if (strcmp(argv[i], "-p") == 0)
    {
            type = 4;
            mask[4] = 1;
            priority = atoi(argv[i+l]);
            cout << "priority = " << priority << endl;
    }
    else if (strcmp(argv[i], "-f") == 0)
    {
            type = 5;
            mask[5] = 1;
            strcpy((char*)wfID, argv[i+1]);
            cout << "workflowID = " << wfID << endl;
    }
    else if (strcmp(argv[i], "-b") == 0)
    {
            type = 6;
            mask[6] = 1;
            strcpy((char*)wbID, argv[i+1]);
            cout << "workbasketID = " << wbID << endl;
    }
    else if (strcmp(argv[i], "-d") ==0)
    {
            type = 7;
            mask[7] = 1;
            delay = atol(argv[i+1]);
            cout << "delay = " << delay << endl;
```

```
}
else if (strcmp(argv[ij, "-t") == 0)
{
    type =8;
    mask[8] = 1;
    wait = atoi(argv[i+1]);
    cout << "wait= " << wait << endl;
}
else if (strcmp(argv[i], "-v") == 0)
{
    type = 9;
    mask[9] = 1;
    interval = atoi(argv[i+ 1]);
    cout << "interval = "<< interval << endl;
}
else if (strcmp(argv[i], "-a") == 0)
{
    type = 10;
    mask[10] = 1;
    strcpy((char*)action, argv[i+1]);
    cout << "action= " << action << endl;
}
 else
{
    cout << "Unknown parameter." << endl;
    return;
}
} if (mask[0] == 0)
{
 cout << "Item ID was not specified." << endl;
 return;
} if (mask[0] == 0 && mask[I] == 0 && mask[2] == 0 && mask[3] == 0
    &&
    mask[4] == 0 && mask[5] == 0 && mask[6] == 0 && mask[7] == 0
    &&
    mask[8] == 0 && mask[9] == 0 && mask[I0] ==0)
{
 cout << "No parameter was specified." << endl;
 return;
}
```

```
cout << running ..." << endl;

while (1)
{
    item = (DKWorkManagementInfoDL*)wfDL.workManagementInfo(itemID);

if (mask[1] && item->getSuspensionStatus() == suspension)
            result[1] = 1;
    if (mask[2] && item->getWorkFlowStatus() == wip)
            result[2] = 1;
    if (mask[3] && item->getReleaseType() == release)
            result[3] = 1;
    if (mask[4] && item->getPriority() == priority)
            result[4] = 1;
    if (mask[5] && item->getWorkFlowID() == wfID)
            result[5] = 1;
    if (mask[6] && item->getWorkBasketID() == wbID)
            result[6] = 1;
    if (mask[7])
            result[7] = 1;
    if (mask[8])
            result[8] = 1;
    if (mask[9])
            result[9] = 1;
    if (mask[10])
            result[10] = 1;

if ((mask[1]  ==  result[1]) &&
        (mask[2]  ==  result[2]) &&
        (mask[3]  ==  result[3]) &&
        (mask[4]  ==  result[4]) &&
        (mask[5]  ==  result[5]) &&
        (mask[6]  ==  result[6]) &&
        (mask[7]  ==  result[7]) &&
        (mask[8]  ==  result[8]) &&
        (mask[9]  ==  result[9]) &&
        (mask[10] ==  result[10]))
    {
      if (result[10])
      {
      if (result[7]) Sleep(delay);

if (result[8])
            strcpy((char *)buffer, (char *)"START /WAIT ");
      else
            strcpy((char *)buffer, (char *)"START ");

strcat(buffer, action);
```

*FIG. 9E*

```
      system(buffer);
      delete item;
      break;
   }
   else
   {
      delete item;
      break;
   }
} delete item;                                                    900
                                                               /
if (result[9])
      Sleep(interval);
else
      Sleep(1000);

}
   dsDL.disconnect();
} catch(DKException &exc)
{
   cout <<  "Error id "              << exc.errorId() <<endl;
   cout <<  "Exception id "          << exc.exceptionId() <<endl;
   for(unsigned long i = 0; i< exc.textCount(); i++)
   {
       cout << "Error text: "<<exc.text(i) <<endl;
   }
    for (unsigned long g=0; g< exc.locationCount(); g++)
   {
       const DKExceptionLocation* p = exc.locationAtIndex(g);
       cout << "Filename: " << p-fileName() << endl;
       cout << "Function: " << p-functionName() << endl;
       cout << "LineNumber: " << p-lineNumber() << endl;
   }
     cout << "Exception Class Name: " << exc.name() << endl;
}
  return;
}
```

*FIG. 9F*

WORKFLOW AGENT FOR A MULTIMEDIA DATABASE SYSTEM

PROVISIONAL APPLICATION

This application claims the benefit of U.S. Provisional Application No. 60/107,394, entitled "WORKFLOW AGENT FOR A MULTIMEDIA DATABASE SYSTEM," filed on Nov. 6, 1998, by Alan T. Yaung, which is incorporated by reference herein.

BACKGROUND OF THE INVENTION

1. Field of the Invention

This invention relates in general to computer-implemented database management systems, and, in particular, to a workflow agent for a multimedia database system.

2. Description of Related Art

Workflow management is an essential element in today's enterprise data processing. An "enterprise" is a business organization that uses computers. Workflow refers to a defined series of tasks within an organization to produce a final outcome. For example, one workflow system may enable defining workflow so that a document is routed from a writer to a proofreader.

Some multimedia database systems provide workflow capability through a set of workflow-related Application Programming Interfaces (APIs). However, these workflow systems have certain deficiencies. One deficiency is that they lack workflow-based application invocation. Another deficiency is that they lack workflow-based event notification. Workflow-based application invocation facilitates the application integration with the workflow logic, while workflow-based event notification facilitates the synchronization between workflow logic and application logic. Without these capabilities, it would be difficult for application developers to deliver sensible workflow applications to their customers.

There is a need in the art for improved workflow techniques that solves the deficiencies mentioned above.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented workflow agent.

In accordance with the present invention, items stored in a data store connected to a computer are tracked in the computer. Initially, a workflow agent is invoked. Under control of the workflow agent, an item in the multi-media data store is monitored to determine whether the item meets one or more specified conditions. When the monitoring indicates that the item meets the one or more specified conditions, under control of the workflow agent, whether an action is to be performed is determined. When it is determined that an action is to be performed, the action is performed.

BRIEF DESCRIPTION OF THE DRAWINGS

Referring now to the drawings in which like reference numbers represent corresponding parts throughout:

FIG. 8 is a diagram illustrating a test.cmd program listing; and

FIGS. 9A–F are diagrams illustrating a WFAgent.cpp program listing.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
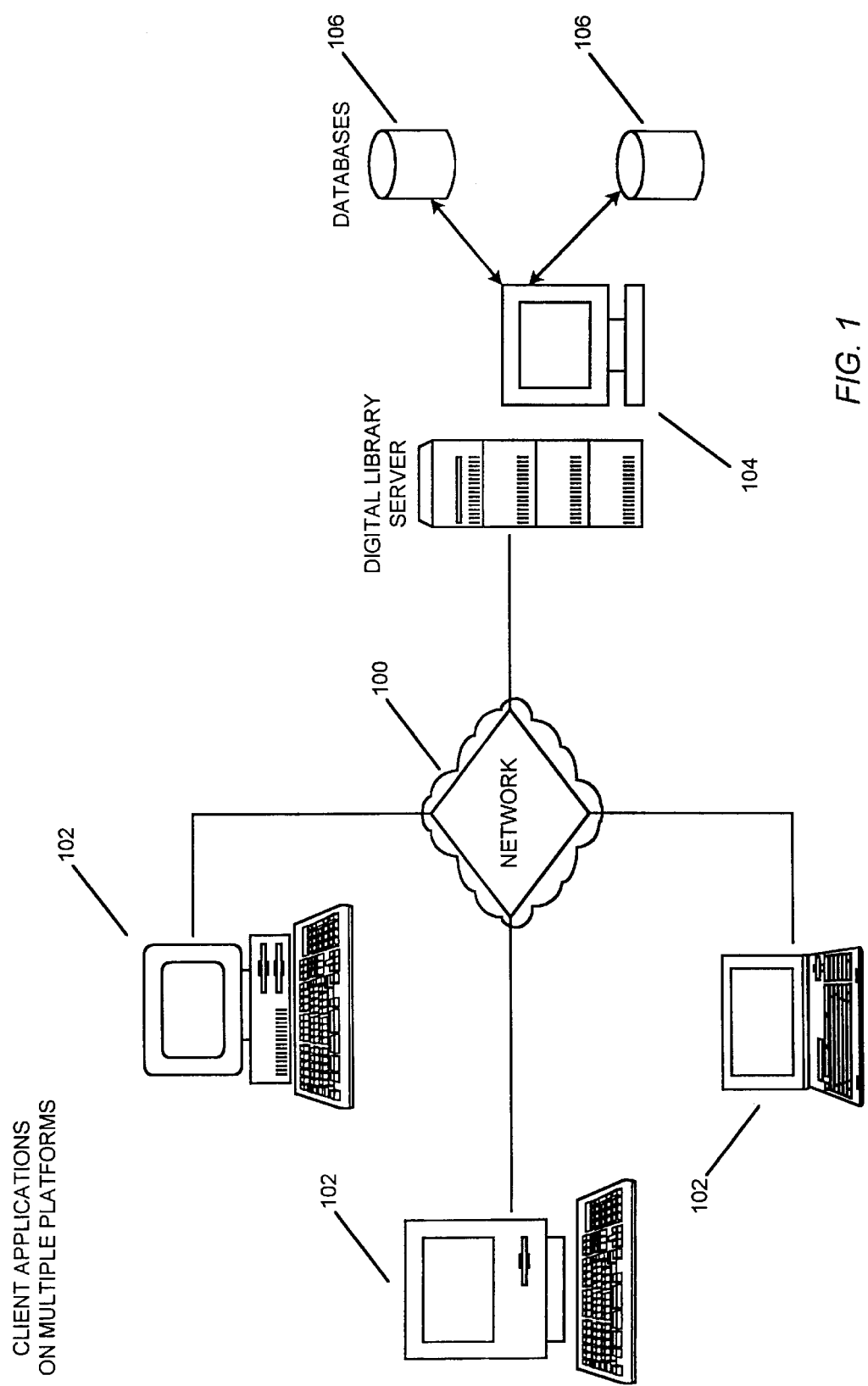
FIG. 1 schematically illustrates the hardware environment of a preferred embodiment of the present invention, and more particularly, illustrates a typical distributed computer system.

FIG. 1 schematically illustrates the hardware environment of a preferred embodiment of the present invention, and more particularly, illustrates a typical distributed computer system using the network 100 to connect client computers 102 executing client applications to a Digital Library server computer 104 executing software and other computer programs, and to connect the server system 104 to data sources 106 storing. A data source 106 may comprise, for example, a multi-media database. A typical combination of resources may include client computers 102 that are personal computers or workstations, and a Digital Library server computer 104 that is a personal computer, workstation, minicomputer, or mainframe. These systems are coupled to one another by various networks, including LANs, WANs, SNA networks, and the Internet.

A client computer 102 typically executes a client application and is coupled to a Digital Library server computer 104 executing server software. The client application is typically a software program such as a workflow application. The server software is typically a program such as IBM's Digital Library server software. The Digital Library server computer 104 also uses a data source interface and, possibly, other computer programs, for connecting to the data sources 106. The client computer 102 is bi-directionally coupled with the Digital Library server computer 104 over a line or via a wireless system. In turn, the Digital Library server computer 104 is bi-directionally coupled with data sources 106.

The data source interface may be connected to a Database Management System (DBMS), which supports access to a data source 106 by executing RDBMS software. The interface and DBMS may be located on the same server as the Digital Library server computer 104 or may be located on a separate machine. The data sources 106 may be geographically distributed.

Those skilled in the art will recognize many modifications may be made to this configuration without departing from the scope of the present invention.

Workflow Agent for a Multimedia Database System

An embodiment of the present invention provides a workflow agent(i.e., a software agent technique) that provides an effective approach to managing the workflow in a multimedia database system. In one embodiment of the invention, a workflow agent is used for both workflow-based application invocation and workflow-based event notification.

Software agent techniques have been gaining more attention in recent years. The software agent techniques have been developed in the field of artificial intelligence (AI) and are directed to making decisions using rules in a computer. The workflow agent of the embodiment of the invention applies a software agent technique into the workflow management of a multimedia database system. In particular, the workflow agent makes decisions or performs actions based on pattern matching.

The workflow agent presented in this embodiment of the invention provides the enhancements on application invocation capability and workflow-based event notification. The workflow agent is useful in tracking and handling the workflow item of interest in a multimedia database system.

In particular, a workflow agent is designed to monitor an item (e.g., a document stored in a multimedia database) of interest on a real-time basis. The workflow agent performs the monitoring to determine whether certain conditions are met. If the conditions are met, the workflow agent performs a specified action. The workflow agent is autonomous and does not require any user intervention.

The embodiment of the invention provides an alternative solution to workflow-based application invocation for those customers who do not use a general-purpose workflow engine. The workflow agent is a cost effective approach to workflow application invocation without the overhead introduced by a general-purpose workflow engine.

Figure 2:
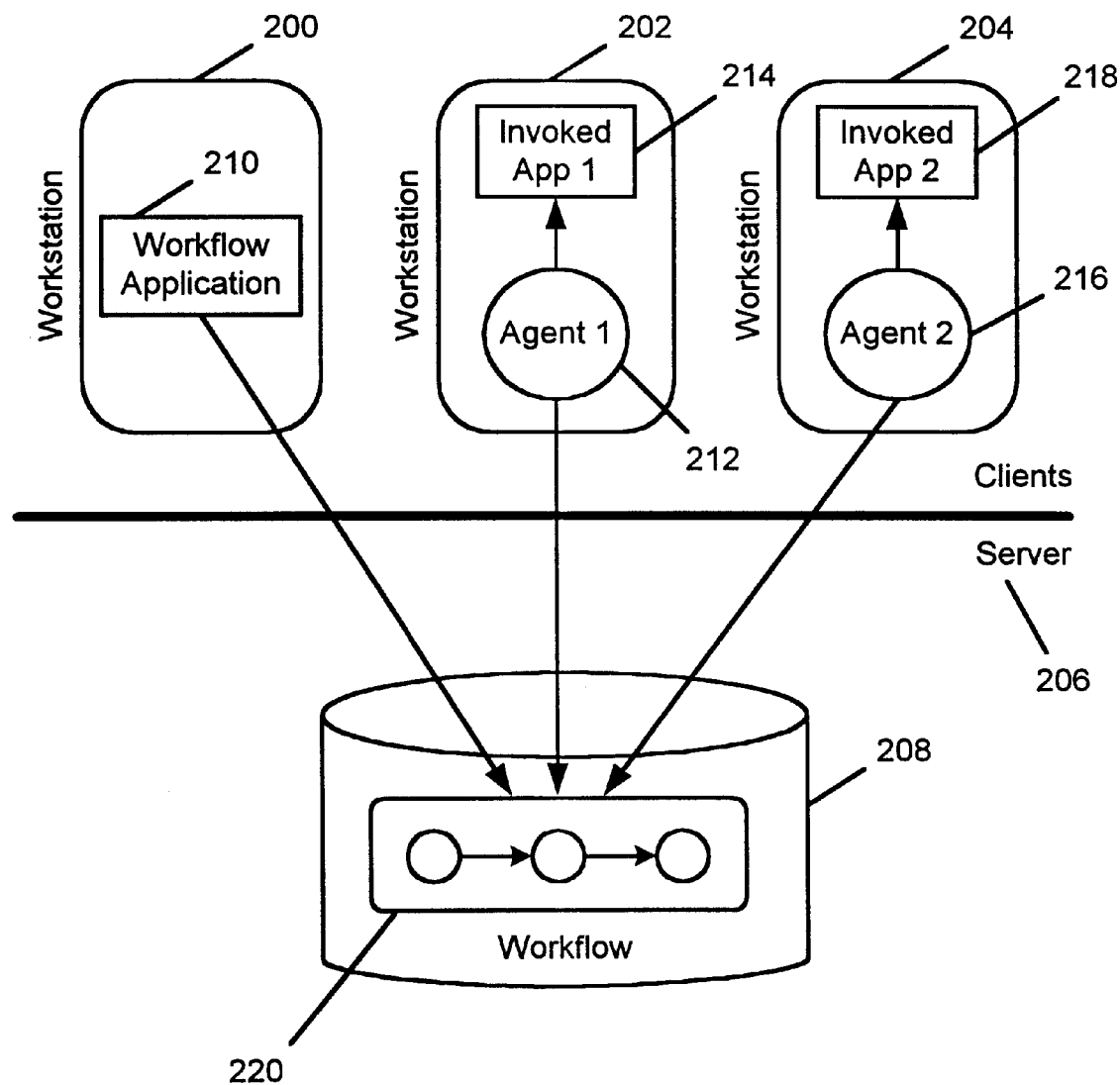
FIG. 2 is a block diagram illustrating one example of workflow in a client/server system.

FIG. 2 is a block diagram illustrating one example of workflow in a client/server system. The clients are comprised of workstations 200, 202, and 204 are connected to a server 206 via a network, such as the Internet. The server comprises a multi-media database 208. A workflow application 210 is executing on workstation 200. The workflow application 210 uses a workflow agent 212 (i.e., Agent 1) to invoke an application 214 (i.e., Invoked App 1) on workstation 202. Additionally, the workflow application 210 uses a workflow agent 216 (i.e., Agent 2) to invoke an application 218 (i.e., Invoked App 2) on workstation 204.

The workflow 220 may be represented by a series of circles and arrows. Each circle in the workflow 220 may represent a workbasket, which is a collection of items from a multimedia database (e.g., a set of related documents). The arrows in the workflow 220 may represent the flow of direction of the work. In one embodiment, a user assigns an item from the multimedia database 208 to a workbasket. Through a designated workflow, the item in a workbasket may be routed to different workbaskets. Thus, the workflow agent can work well in a client/server environment.

In particular, FIG. 2 shows how multiple workflow agents 212 and 216 residing on different workstations 202 and 204 interact with a workflow application 210 residing on another workstation 200. The workflow application 210 can use a workflow agent 212 or 216 that is running on a geographically remote workstation. A workflow agent may be used for event notification or to invoke an application. Moreover, the workflow agent 212 or 216 could be invoked from any one of the workstations 200, 202, or 204, either from a workflow application or from a command line.

For example, the workflow application 210 invokes the workflow agent 212 to monitor a document in the multimedia database 208. Upon invoking the workflow agent 212, the workflow application 210 is suspended. The workflow agent 212 then monitors the document to determine whether the document meets conditions specified by the workflow application 210. When the workflow agent determines that the document being monitored meets the specified conditions, the workflow agent 212 invokes the application 214. If the workflow agent 212 was invoked with an indication to wait for completion of application 214, the workflow agent 212 waits and returns to the workflow application 210, otherwise, the workflow agent 212 returns immediately after invoking the application 214. By returning to the workflow application 210 at a synchronization point in the workflow application 210, the workflow agent 212 provides an implicit event notification. Although the event notification is implicit in this example, the event notification may also be made explicit using an action that is to be performed based on monitoring of a document. A synchronization point in the workflow application 210 is a point at which the workflow application 210 invoked the workflow agent 212 and then was suspended. When the workflow application 210 receives the event notification, the workflow application ends its suspension and continues processing. Although, in this example, the workflow agent 212 invoked an application 214, in some embodiments, the workflow agent 212 returns an event notification to the workflow application 210 without invoking another application.

Although the example of FIG. 2 illustrates that a workflow application invokes a workflow agent, a workflow agent may also be executed in other ways, for example, by invoking the workflow agent from, for example, a UNIX command line.

A workflow agent is started with a set of input parameters, described below. After the workflow agent has started, the workflow agent connects to a multimedia database. The workflow agent then processes the input parameters that specify the firing conditions (i.e., conditions that are to be met prior to performing an action), the expected action to be performed (e.g., invoking an application), and other restrictions. Input parameters form a workflow rule that is composed of three parts: a condition part, an action part, and a restriction part.

In the current design, the condition part allows the user to specify one or more of the following conditions:
- -i item ID—the required item identifier (ID) of a document to be monitored
- -s suspension status—indicating whether the identified item is suspended, with the suspension status being specified as follows:
    - 32—the item is suspended.
    - 64—the item is not suspended.
- -w workflow status—indicating the workflow status of the item as follows:
    - 1—the item is not in a workflow.
    - 2—the item is in a workflow.
    - 4—the item has completed its workflow and its history has been archived.
    - 8—the item has been removed from a workflow.
    - 16—the item has completed its workflow but its history has not been archived.
- -r release type—indicating how an item is to be released, with the release criteria of the item specified as follows:
    - 0—the item is suspended indefinitely.

1—the item is suspended until a preset time.
2—valid for folder items only: the folder item is suspended until inclusion of an item of every type of the awaited classes or the arrival of a preset time.
3—valid for folder items only: the folder item is suspended until inclusion of an item of any one of the possible awaited classes or the arrival of a preset time.
4—the item is not suspended.
-p priority—indicating the priority of the item
-f workflow ID—indicating the workflow ID of the containing workflow (i.e., the item may be contained within a workflow, which is a collection of multiple workbaskets).
-b workbasket ID—indicating the workbasket ID of the containing workbasket (e.g., the item may be contained in a workbasket).

The action part allows a user to specify the expected action to be taken when the specified conditions are met by an item. The action may be the name of an executable program (e.g., an application or a command file) with parameters. The action may, for example, transmit a fax or email. For example, the following is a valid action that executes the Netscape Navigator program and displays a web page specified by "www.yahoo.com": "E:\Netscape\Communicator\program\netscape.exe www-.yahoo.com".

The restriction part allows a user to specify zero or more of the following restrictions:
  -a action—indicating the action to be performed.
  -v interval—indicating the interval of checking whether the monitored item meets the conditions, with the default interval being set to 1000 milliseconds
  -d delay—indicating the delay time of starting or firing the action, with the default delay time being set to 0 millisecond (i.e., the action is fired immediately)
  -t wait—indicating whether the workflow agent waits for the termination of the action, with the default setting being FALSE
  -h help—indicating that help information is to be provided.

The following is an example of a workflow rule for starting a workflow agent with input parameters:
  wfagent -i "EP8L8OR9MHH##QES" -w 2 -d 5000 -t 1 -v 5000
  -a "E:\Netscape\Communicator\Program\netscape.exe www.yahoo.com"

For the above workflow rule example, "wfagent" indicates that this is a workflow rule. The following provides an explanation of the other elements of the workflow rule:
  item ID
    Flag: -i
    Value: "EP8L8OR9MHH##QES" (which identifies an item) workflow status
    Flag: -w
    Value: 2 (which indicates that the document is "currently in workflow")
  delay
    Flag: -d
    Value: 5000 milliseconds (which indicates that there is to be at 5000 millisecond delay prior to executing an action)
  wait
    Flag: -t
    Value: 1 meaning TRUE (which indicates that the workflow agent is to wait for the action to be completed before continuing with its processing)
  interval
    Flag: -v
    Value: 5000 milliseconds (which indicates that the workflow agent should make a determination every 5000 milliseconds as to whether the monitored item meets the specified conditions)
  action
    Flag: -a
    Value:
      "E:\Netscape\Communicator\program\netscape.exe. www.yahoo.com" (which indicates that the action to be performed is to execute the Netscape Navigator and display a web page specified by "www.yahoo.com")

Based on the input parameters, the workflow agent will construct a condition pattern. A condition pattern is a vector of binaries (i.e., zeroes and ones) indicating the presence of input parameters.

The condition pattern is a series of bits ordered in the following format:
  <item ID,
  suspension status,
  workflow status,
  release type,
  priority,
  workflow ID,
  workbasket ID,
  delay,
  wait,
  interval, When a condition is specified in a workflow rule, its representative bit is set to one. When a condition is not specified in a workflow rule, its representative bit is set to zero. When a bit is set to zero, depending on the condition, either a default value is used or the condition is not monitored. For example, if an interval is not provided, a default interval is used, but, if a suspension status is not provided, the workflow agent does not monitor an item for suspension status.

For the above workflow rule example, the condition pattern is <10100001111>, indicating that the workflow rule specifies an item ID, a workflow status, a delay, a wait, an interval, and an action.

The workflow agent constructs a result pattern by checking the item for conditions indicated in the condition pattern. For example, the result pattern may check on whether a specified item (i.e., specified by item ID in the condition pattern) is suspended (i.e., a suspension status). The workflow agent then compares the condition pattern and the result pattern to determine whether these match. The result pattern follows the same format as the condition pattern described above. By following the same example, if the result pattern constructed is <10100001111>, the workflow agent determines that the condition pattern matches the result pattern. Otherwise, the workflow agent determines that the condition pattern and result pattern do not match.

If the condition pattern matches the result pattern and an action is specified, the workflow agent starts the action, immediately if no delay is specified or after waiting the amount of time specified with a delay flag. The workflow agent disconnects from the multimedia database after the specified action is started. If no action is specified, the workflow agent disconnects from the multimedia database.

If the condition pattern does not match the result pattern and no interval of checking conditions is specified, the workflow agent uses the default checking period of 1000 milliseconds. If the condition pattern does not match the result pattern, and an interval of checking conditions is specified, the workflow agent delays the specified period before matching the patterns. After checking the condition pattern, the workflow agent again constructs a result pattern and performs the comparison discussed above. After determining that the condition pattern matches the result pattern, the workflow agent performs an action, if one is specified, and disconnects from the multimedia database.

Figure 3:
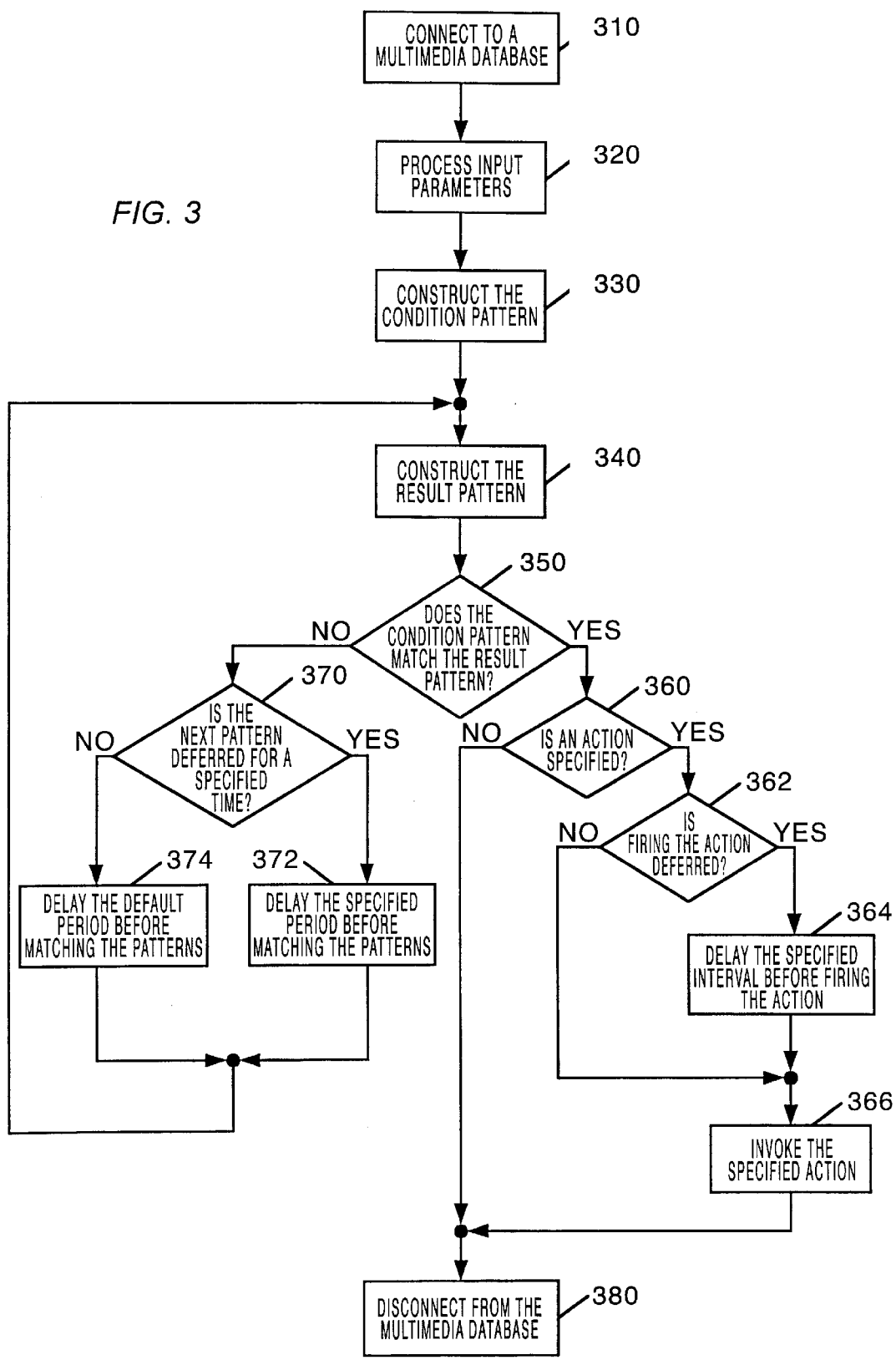
FIG. 3 is a flow diagram illustrating the steps performed by a workflow agent.

FIG. 3 is a flow diagram illustrating the steps performed by a workflow agent. In block 310, the workflow agent has been started and connects to a multimedia database. In block 320, the workflow agent processes input parameters. Using these input parameters, in block 330, the workflow agent constructs a condition pattern. In block 340, the workflow agent constructs a result pattern by checking the conditions specified in the condition pattern. In block 350, the workflow agent determines whether the condition pattern matches the result pattern. If the condition pattern matches the result pattern, the workflow agent continues to block 360, otherwise, the workflow agent continues to block 370.

If the condition pattern matches the result pattern, in block 360, the workflow agent determines whether an action is specified. If an action is specified, the workflow agent continues to block 362, otherwise, the workflow agent continues to block 380. In block 362, the workflow agent determines whether the firing of the action is to be deferred. If the firing is to be deferred, the workflow agent continues to block 364, otherwise, the workflow agent continues to block 366. In block 364, the workflow agent delays the specified interval of time before firing the action. In block 366, the workflow agent fires the specified action. In block 380, the workflow agent disconnects from the multimedia database.

If the condition pattern does not match the result pattern, in block 370, the workflow agent determines whether the next pattern matching is deferred for a specified period. If the next pattern matching is to be deferred, the workflow agent continues to block 372, otherwise, the workflow agent continues to block 374. In block 372, the workflow agent delays performing pattern matching again for a specified period. In block 374, the workflow agent delays performing pattern matching again for a default period. After blocks 372 and 374, the workflow agent loops back to block 340 to construct a result pattern and attempt to match the condition and result patterns.

Workflow Agent Scenarios

There are four usage scenarios that can demonstrate the use of the workflow agent. The possible scenarios are as follows: workflow-based event notification, application invocation without waiting, application invocation with waiting, and stand-alone workflow agent. Each of these scenarios will be discussed below.

Figure 4:
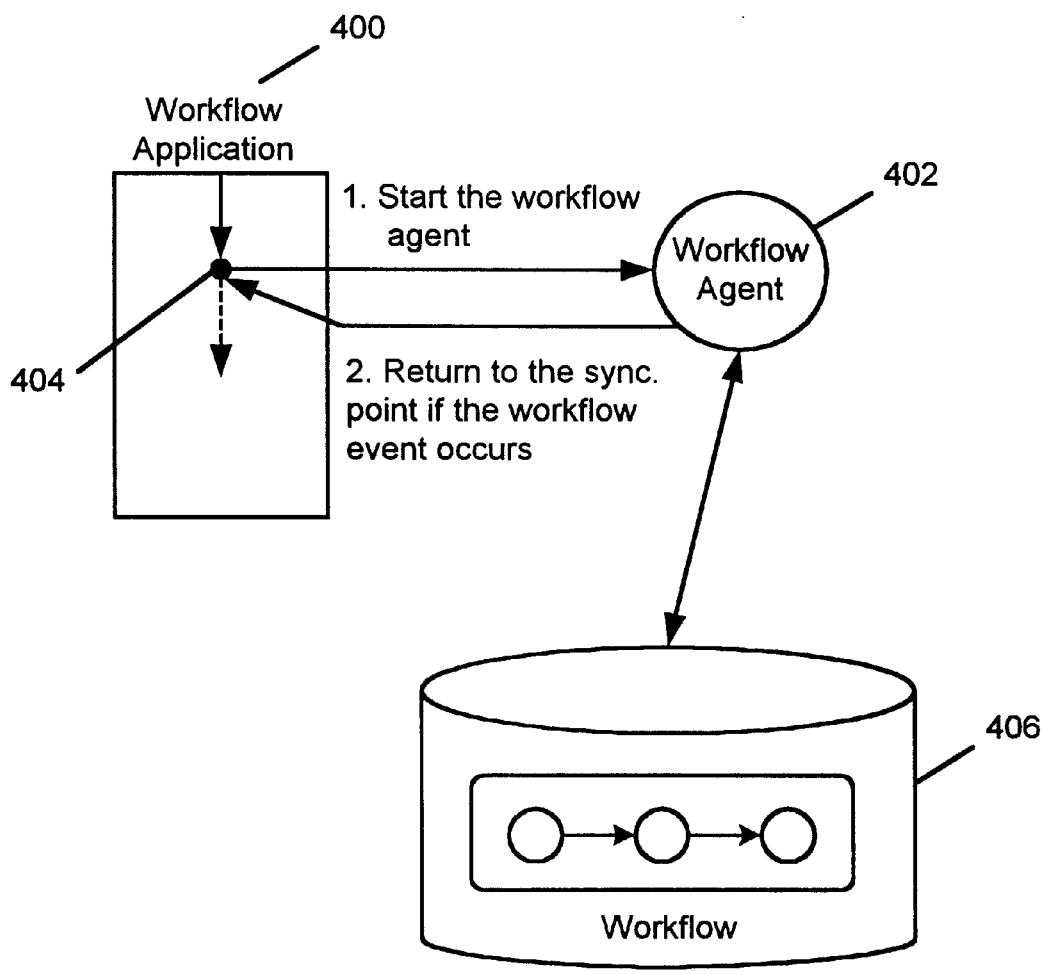
FIG. 4 is a block diagram illustrating a workflow agent that provides workflow-based event notification.

FIG. 4 is a block diagram illustrating a workflow agent that provides workflow-based event notification. Some multimedia database systems do not provide any workflow-based event notification capability. However as shown in FIG. 4, a workflow agent can provide workflow-based event notification in a multimedia database system. In particular, a workflow application 400 launches a workflow agent 402. The workflow application 400 is then suspended and waits for the return of the workflow agent 402 to a synchronization point 404. As discussed above, the workflow agent 402 is launched with a condition pattern that identifies a document in a multimedia database 406 and specifies the conditions that are to be tracked for that document. The workflow agent 402 monitors the identified document for the specified conditions. As soon as the specified conditions are met, the workflow agent 402 returns to the synchronization point 404 of the workflow application 400. At this point, the workflow application 400 resumes its execution. In essence, this is a simulated workflow-based event notification. The set of conditions that the workflow agent 402 is interested in is a logical workflow-based event.

Figure 5:
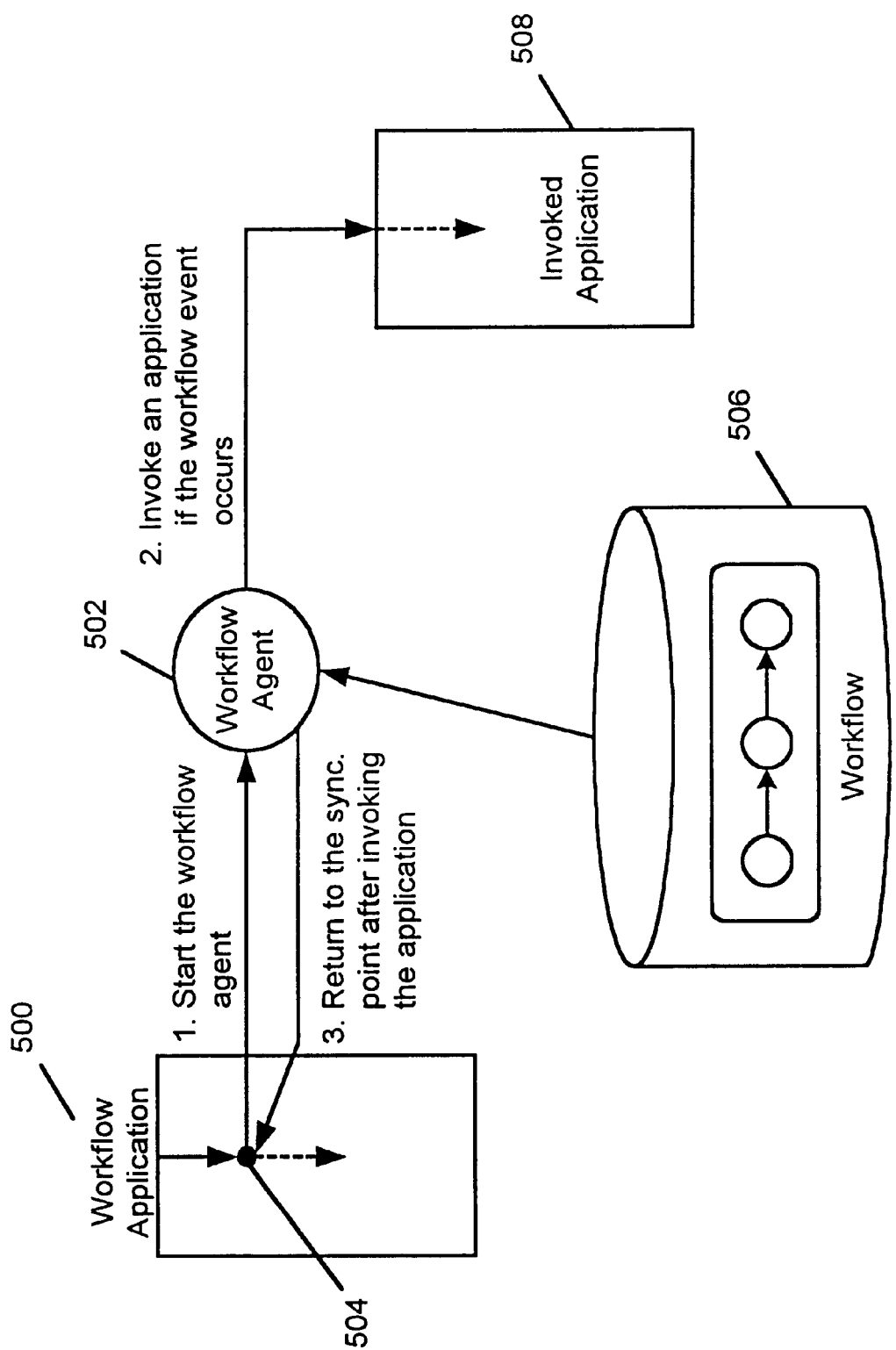
FIG. 5 is a block diagram illustrating a workflow agent that provides application invocation without waiting.

FIG. 5 is a block diagram illustrating a workflow agent that provides application invocation without waiting. Some multimedia database systems do not provide application invocation capability for workflow-based solutions. In a scenario of application invocation without waiting, a workflow application invokes another application using a workflow agent, and then the workflow application proceeds with processing without waiting for the termination of the invoked application.

In FIG. 5, a workflow application 500 launches a workflow agent 502. The workflow application 500 is then suspended and waits for the return of the workflow agent 502 to the synchronization point 504. The workflow agent 502 is launched with a condition pattern that identifies a document in a multimedia database 506 and specifies the conditions that are to be tracked for that document. The workflow agent 502 monitors the identified document for the specified conditions. As soon as the specified conditions are met, the workflow agent 502 invokes another application 508 (i.e., this is an example of an action that may be specified in the condition pattern). The workflow agent 502 returns to the synchronization point 504 of the workflow application 500 after the invocation of application 508. The workflow application 500 resumes its execution, while the invoked application 508 is still running.

Figure 6:
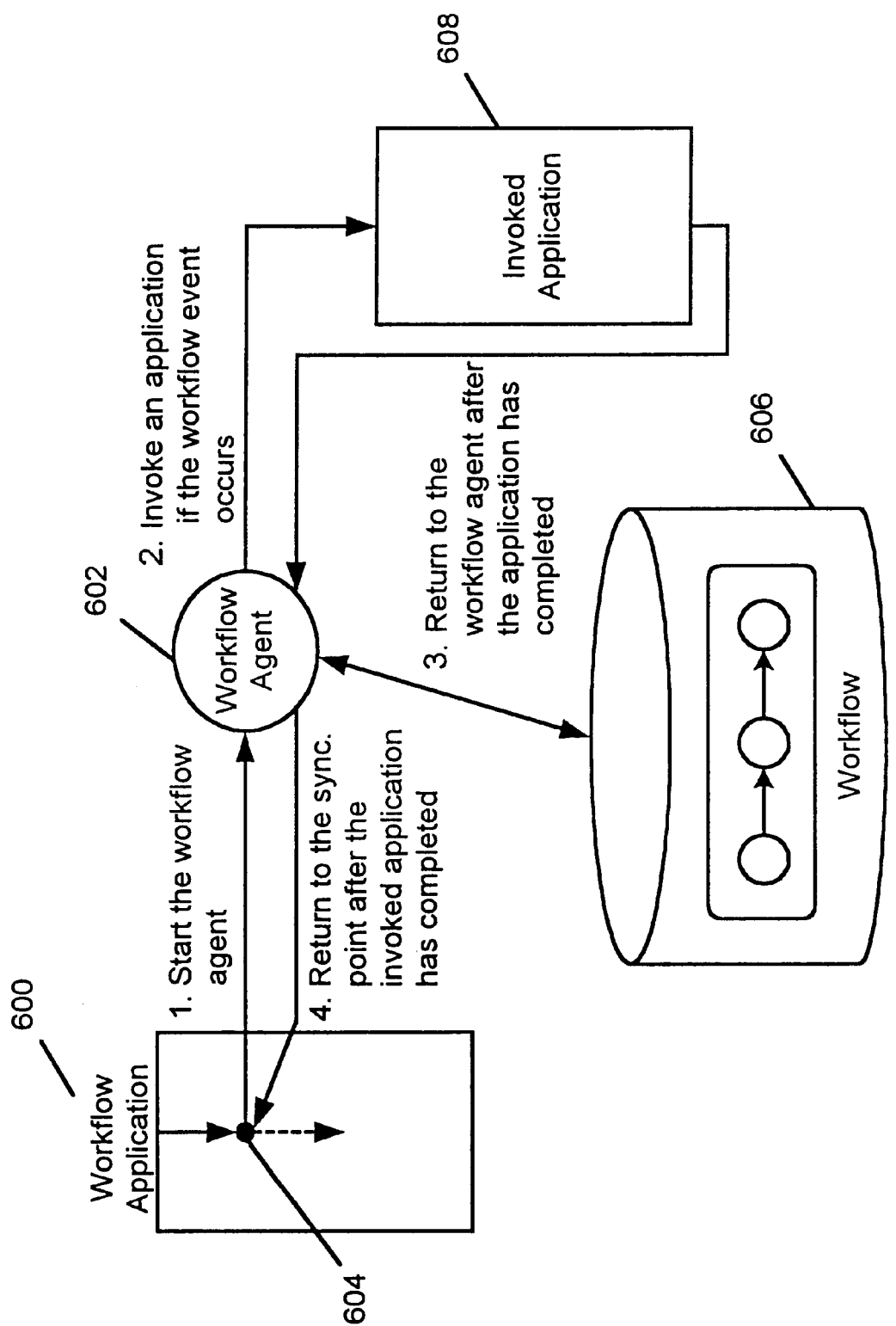
FIG. 6 is a block diagram illustrating a workflow agent that provides application invocation with waiting.

FIG. 6 is a block diagram illustrating a workflow agent that provides application invocation with waiting. Some multimedia database systems do not provide application invocation capability for workflow-based solutions. In a scenario of application invocation with waiting, a workflow application invokes another application. Then, the workflow application suspends its processing until the invoked application completes processing (i.e., the workflow application waits for the termination of the invoked application).

In FIG. 6, a workflow application 600 launches a workflow agent 602. The workflow application 600 is then suspended and waits for the return of the workflow agent 602 to the synchronization point 604. The workflow agent 602 is launched with a condition pattern that identifies a document in a multimedia database 606 and specifies the conditions that are to be tracked for that document. The workflow agent 602 monitors the identified document for the specified conditions. As soon as the specified conditions are met, the workflow agent will invoke another application 608. The workflow agent 602 returns to the synchronization point 604 of the workflow application 600 after the invoked application 608 has completed its processing. The workflow application 600 resumes its execution after the invoked application 608 terminates.

Figure 7:
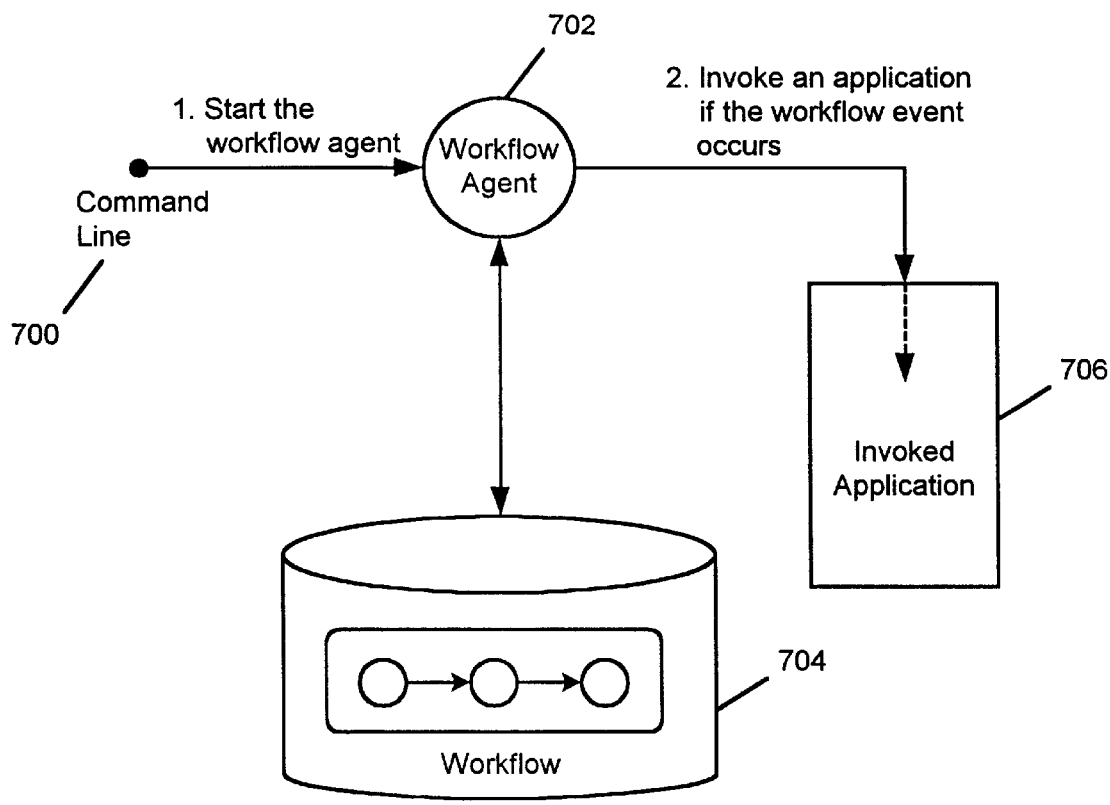
FIG. 7 is a block diagram illustrating a stand-alone workflow agent.

FIG. 7 is a block diagram illustrating a stand-alone workflow agent. Some multimedia database systems do not provide a stand-alone workflow agent for users. In the scenario of a stand-alone workflow agent, a workflow agent may be used to invoke an application outside of a workflow application.

In FIG. 7, a workflow agent 702 is launched from a command line 700 (e.g., a UNIX command line). The workflow agent 702 is launched with a condition pattern that identifies a document in a multimedia database 704 and specifies the conditions that are to be tracked for that document. The workflow agent 702 monitors the identified document for the specified conditions. As soon as the specified conditions are met, the workflow agent 702 invokes another application 706. After invoking the application 706, the workflow agent 702 terminates and the invoked application 706 continues its execution.

FIG. 8 is a diagram illustrating a test.cmd program listing. The test.cmd program listing 800 contains remarks, preceded by "rem", to further explain test.cmd the program listing 800. The test.cmd program listing 800 is executed to invoke two workflow agents in serial fashion. However, this example is not intended to limit the invention to two workflow agents or to invoking the workflow agents in a serial fashion. In fact, one or more workflow agents may be invoked, and multiple workflow agents may be invoked in parallel. One workflow agent is invoked with the statement "e:\dlv200c\samples\nt\wfagent\release\wfagent -t 1 -i "R34V@PRUF#HELH#H" -w 2 -v 5000 -d 5000", and another workflow agent is invoked with the statement "start e:\dlv200c\samples\nt\wfagent\release\wfagent -i "R34V@PRUF#HELH#H" -w 16 -v 5000 -a "\"C:\Program Files\Netscape\Communicator\Program\netscape.exe\" www.yahoo.com" -t 1".

FIGS. 9A–9F are diagrams illustrating a WFAgent.cpp program listing. The WFAgent.cpp program listing 900 provides an example of a program listing 900 that may be used to implement a workflow agent.

The Digital Library

In one embodiment of the invention, the advanced database for storing image files is the DB2 Digital Library Version 2 ("Digital Library") from International Business Machines, Corporation. The Digital Library provides an end-to-end solution for managing multimedia content. The Digital Library enables users to reach new markets and establish new sources of revenue through improved management and reuse of media assets; preserve assets from physical deterioration; protect assets with advanced rights management; consolidate management of text, images, audio and video with easier, faster access; save money with electronic delivery; and, be ready for Year 2000.

The Digital Library may help businesses and institutions in the areas of higher education, media and publishing, entertainment, culture, health, and commerce, provide greater access to their digital assets, while enhancing their growth and new revenue opportunities. The Digital Library enables petabytes of text, images, audio and video, to be created or transformed into digital form and distributed over any network, with security, to users around the world.

The Digital Library has numerous advantageous features including enhanced platform support including support for Windows NT and Macintosh, multi-language development tools, enhanced rights management, integrated multi-search capability, integrated support for IBM media servers, java-based system administration interface, easier installation with graphical user interface guides, and IBM DB2 Universal Database components.

The fundamental market shift from analog to digital has created a new competitive environment that is changing the business is transacted. From media production groups to print and Web publishers; from research and teaching to distance education; from the fast-paced world of television news to Hollywood studios, it's digital media that is driving the change. This digital media may be text, full-motion video, audio, graphics, or images. Whatever its form, the challenge is to provide media asset solutions with sufficient storage capacity, scalability, speed, multi-level security, sophisticated searching techniques and Internet access to reach new markets, preserve assets from loss or deterioration, and ensure copyright protection.

The Digital Library integrates the technologies of information capture, storage management, search and retrieval, and secure distribution into a single offering. The Digital Library provides a solution framework to allow companies to build digital libraries using their choice of client and server platforms; then to distribute their content, with security and intelligent management, to users around the world.

The Digital Library provides a sophisticated end-to-end solution for maximizing the value of multimedia assets. It can be used to create customer-specific solutions in any industry.

Integrated multi-search capability lets a user develop Web-based and desktop Digital Library applications using APIs in Java, C++, C or Active X that combine catalog and text searches in a single query. A sample Java applet which demonstrates this multi-search capability comes with the Digital Library. This capability offers numerous features including searching images by color average, distribution, position and image texture; searching and retrieving documents in multiple languages with support for single and double byte languages; performing fuzzy and phonetic searches; searching stored objects, including parametric and full text searches; searching with Boolean logic by a single word, a phrase, or multiple terms; using natural language when specifying a query; ranking search results based on their relevance; and clustering results lists.

A user can protect intellectual property with enhanced rights management functions, including watermarking techniques for bi-level and color images, and data hiding for images. Extensive and customizable access control functionality is provided that supports secured access to object servers. Also, image watermarking that uses a user's own unique mark is supported. In a future release, IBM plans to support secure content delivery.

A user can use the improved Java-based system administration tool to perform IBM DB2 Digital Library system administration tasks through the Internet or from the desktop. These tasks include, for example but not by way of limitation, accessing the contents of the IBM DB2 Digital Library through Web browsers and developing new Internet applications using Java applets and APIs for Java, C++ and Active X.

The Digital Library is highly scalable. The Digital Library has numerous features including the ability to grow from a single workstation to a networked enterprise-wide solution; the ability to maintain collections on a single PC then grow to managing the collections using storage servers that contain terabytes or even petabytes of data, the ability to use networked IBM Tape Library and Optical Library units under System Managed Storage control, and the ability to use RS/6000 configurations with multiple Object Server nodes, fast switching and high availability. These multiple distributed Object Storage Servers allow the selection of specialized server types that are best suited to the storage and distribution of a particular data type, allow the location of servers to be placed close to users to reduce network demands and improve user response time, and allow for the storage of multiple parts of a single digital asset on different Object Servers.

Multi-language development tools help a user develop Digital Library applications which can create, query and update data managed by the Digital Library. They support the use of a variety of APIs, including Java, C++, C and Active X. The applications can access IBM DB2 Digital Library data via the Internet or desktops on the AIX and Windows platforms. These development tools support content independent storage and distribution of digital assets, offer a Client/Server design that allows intermixing different platforms within the same solution, accommodate a wide range of heterogeneous clients that can be intermixed as needed, and provide interfaces for an organization's existing data distribution methods as well as many popular authoring tools.

The Query By Image Content (QBIC) technology allows a user to search for images by color percentages, distribution, position and image texture. And the image search capability may be used with catalog and text searches as part of the integrated multi-search.

The integrated digital media object management is available using media servers. The Digital Library Media Manager works with the IBM VideoCharger Server for AIX product to deliver streaming digital audio and MPEG video objects over the Internet.

The Digital Library contains selected components of IBM DB2 Universal Database Version 5 that may be installed and used exclusively to support IBM DB2 Digital Library.

Improved installation is made possible by a graphical user interface which guides a user through the installation of IBM DB2 Digital Library quickly and efficiently.

Online help is delivered in HTML to easily view from an included Web browser. Clicking on help automatically opens the browser and takes a user to the appropriate help topic. All the books are available on one CD-ROM and can be printed or viewed online.

When used in accordance with its associated documentation, IBM DB2 Digital Library is capable of correctly processing, providing and/or receiving data within and between the 20th and 21st centuries, provided all other products used with the product properly exchange date data with it.

The IBM DB2 Digital Library architecture is based on a triangular client/server model comprised of a Library Server, one or more multimedia Object Servers, and one or more clients. The core of the infrastructure is the Library Server. The Library Server, using IBM DB2 or Oracle database services, manages the IBM DB2 Digital Library catalog information, locates stored objects using a variety of search technologies, provides secured access to the objects held in the collection, and communicates with the Object Servers. The digital content is stored in Object Servers. Objects Servers support the attachment of DASD and other media devices, and can be distributed across an enterprise network to provide convenient user access. The end user, on a client desktop, receives direct access to the information requested from the collection regardless of where the data is stored. Many clients can be connected to the Library and Object Server in an IBM DB2 Digital Library system, including those accessing the IBM DB2 Digital Library using supported Web browsers.

The five integrated functions of IBM DB2 Digital Library enable the collection, organization, storage and management, protection and distribution of multimedia objects.

Digital content from diverse sources can be incorporated into IBM Digital Library by integrating existing tools or importing information. IBM Digital Library Version 2 supports an array of industry-standard scanners and provides the capability to define and import many data formats. Authoring tools from IBM and other vendors can be used to create new digital information to be managed by an IBM DB2 Digital Library. Single point-of-entry business application access can be developed using the APIs provided.

The distributed design supports a full range of platforms, and provides the flexibility and granularity to add server and client capacity where and when it is needed. Enterprise-wide distributed access to library index information and isolating the client-application from the Object Servers provides optimal control and security. Where multiple users require local access to the same data, objects can be cached on Object Servers to improve performance.

IBM DB2 Universal Database technology provides IBM DB2 Digital Library the capability to operate in open, heterogeneous environments delivering industrial-strength levels of integrity, data access, high-volume data management and central-system administration. IBM DB2 Digital Library can also use Oracle database management system for the AIX environment.

IBM DB2 Digital Library enables the parametric search of metadata entries associated with an object and offers the ability to search the content of stored objects. When a text or image object is stored, indexing information can be created; and IBM DB2 Digital Library provides a rich portfolio of search technology for text and image objects. For example, users can query by keyword or Boolean text search, or by image textures and shapes; and they can combine the keyword, text, and image using the multi-search capability. They can express queries in natural language, and the searches return a list of ranked results.

IBM DB2 Digital Library rights management functions control access and help prevent the unauthorized use of intellectual property content. IBM DB2 Digital Library offers the industry's leading rights management technology for authentication, encryption, bailing, and payment systems.

IBM DB2 Digital Library is a technology platform for a wide variety of solution offerings. For example, IBM Media Director integrates with digital audio workstations to provide audio professionals with network access to, and advanced management for, more than 100,000 hours of audio files. Imagine Products' the Executive Producer is a full-f\unction video logging and archiving system with automatic scene detection. IBM Media Management System is an integrated Web-based solution for the automated storage and retrieval of video stock footage, audio, still images and film scripts. IBM DB2 Digital Library Collection Treasury enables cultural institutions to provide online access to valuable original holdings while managing appropriate restrictions on audience access and the reuse of images.

Dewey's greatest invention, the decimal system, was something we all learned in elementary school. Now most libraries use the Library of Congress cataloging system. But mining for information through the mixed-media objects in a digital library required yet another new way of looking at things. Catalog systems only point library users to where the information is located. But IBM DB2 Digital Library uses powerful search and access technologies that help users look at the content to find what they want quickly, accurately and intuitively.

IBM DB2 Digital Library solutions provide content-independent data storage that allows for many kinds of objects to be stored in a scalable archive. Many kinds of media objects that a user wants to access are categorized differently in a manner that's appropriate for each object type. For example, a book can be categorized by title, author or subject. A movie can be categorized by producer, director or theme. If a user is looking for a certain object type, a parametric search looks for metadata entries like author, subject, title, length and the like.

Conventional technology only allows a user to query by keyword, which sends back a list of entries containing that word in its index. IBM's rich portfolio of search technology includes sophisticated tools for text and image analysis. IBM DB2 Digital Library offers natural language query-permitting users to express queries in simple, natural style without concern for exact word positioning. This type of query returns a ranked list, with highest probability of relevance at the top of the list. Textual analysis of words is also performed, for instance, a distinction is made between "White House" and "white house", yet an association is recognized between "IBM" and "International Business Machines Corporation".

The above text mining functions are augmented with further content-based search capabilities, providing tools such as clustering and abstracting techniques for organizing information.

Since an array of multimedia is typically found in a digital library collection, users need to search using more than just language. Query By Image Content (QBIC), IBM's award winning image search technology, allows users to search a collection's media objects by color percentage, distribution, position and image texture expressed graphically, for example, by specifying colors from a color palette or selecting textures from a display of sample images. IBM DB2 Digital Library technology is expanding to include video searching by moving image content.

What's important to remember is that IBM DB2 Digital Library is open. The actual make-up of one digital library can be quite different from another. The search and access power "under the hood" of IBM DB2 Digital Library enables content authors, editors, scholars, users and curiosity seekers to extract the information they need.

Where Search & Access leaves off, the distribution of digital library materials across both internet and networks begins.

Because IBM DB2 Digital Library can provide access to users through any existing computer network, the audience for information is finally, truly global. IBM DB2 Digital Library is open and its content can be distributed directly to users via private networks, a user's intranet, the World Wide Web or interactive TV. This capability represents IBM's commitment to e-business computing, for worldwide information and data exchange.

For many IBM DB2 Digital Library solutions, the IBM Global Network provides a secure, reliable medium for distribution and access to a collection. However, the flexibility of IBM DB2 Digital Library means a user will not be locked into any single distribution medium. And, the distributed information can be viewed and presented using any computer system with a graphical user interface.

Digitalized content, such as images, audio and video, is large in size relative to many existing network capabilities. Moreover, real-time delivery of audio and video is dependent on a network that can assure paced and continuous delivery. IBM has developed extensive advanced networking capabilities, such as Asynchronous Transfer Mode (ATM) switches and network management software, to assist in digital and analog information delivery.

The definition of content ownership is not universal. Copyrights may be protected in one country and practically ignored in the next. So how does a user protect intellectual property rights in a digital library that anyone with a PC can learn to use in a few minutes? Rights Management is the answer. IBM has concentrated on Rights Management as a key factor in creating IBM Digital Library and allowing a user to develop a full digital library solution to meet business needs.

The challenge is to provide ease of use, privacy, content integrity and cost utility for users while establishing bullet-proof Rights Management solutions for content owners. To meet that challenge, IBM DB2 Digital Library incorporates the rich legacy of IBM's innovations in networking security and transactions technology.

Compare using IBM DB2 Digital Library to making a withdrawal from an automated banking machine. A user is identified, enters a password, requests information or an object, and the system checks the request against the user's eligibility. Upon approval the requested objects can be watermarked to deter illegal duplication. And the entire process is conducted in a secure environment without the threat of intrusion. Meanwhile, compensation for the value added to the information or object is duly processed.

IBM DB2 Digital Library can authenticate original media—photos, manuscripts, audio, video, film and images—by using electronic signatures. Digital content can be recognized as authentic with these signatures. Watermarks, a form of electronic signature currently in use throughout several IBM DB2 Digital Library solutions, are encoded onto photos, films, images and manuscripts. Visible watermarks can be graphically representative of a content owner's identity, like a logo or crest. Watermarks are sophisticated identifiers that inhibit the misappropriation of content owners' assets while assuring users' confidence in the authenticity of the content.

IBM's e-business Cryptolope Live! product represents a giant leap forward in distribution for both content owners and users. The Cryptolope an encryption-protected "envelope" that can travel on public networks.

Anybody who wants to open a Cryptolope to read its contents must use a key to unlock it. Users can preview a Cryptolope's contents, then decide whether to pay for the key. For sensitive content needing increased security, a Cryptolope may require several keys. And a Cryptolope can travel on networks with only the intended recipient being aware of its presence. All the while, the IBM e-business service keeps impeccable records of rights payments transacted.

IBM DB2 Digital Library relies on Cryptolope technology for its Rights Management capabilities. With multimedia assets, the work of several content authors is contained within a single media object. For instance, a digitized document might contain a photo, an illustration, a page of text and some music—each authored by a different person who should be compensated. Furthermore, a customer accessing this document might not be required to purchase the entire work, but rather just the individual section that is accessed. Cryptolope technology, the cornerstone of IBM DB2 Digital Library strategy for Rights Management, offers discreet recognition for each content author, keeping track of who gets paid for what. More information on *IBM Cryptolope Live*! is available online.

IBM DB2 Digital Library provides trusted means for protecting and managing the rights of content owners. Rights Management issues impacts every aspect of IBM DB2 Digital Library.

The conversion from paper, tape and film to bits and bytes saves masses of physical space, it's true. But there remains a price to be paid in storage capacity and performance. IBM DB2 Digital Library provides high-performance, scalable storage and management of information in an open environment, across a broad spectrum of platforms.

The key to effectively storing and managing information—especially massive amounts of multimedia data—is the enrichment of the digitized objects so that they can be efficiently organized for search. IBM DB2 Digital Library's information management features include automated indexing, \foldering, correlation, feature extraction and translation functions.

Two other key features of IBM DB2 Digital Library are openness and scalability. IBM Digital Library is an open framework of hardware and software which can be implemented across the full range of platforms, including NT, AIX and OS/390. And IBM DB2 Digital Library provides a powerful and scalable technology base that will grow easily as needs grow—to see projects through from initial production to full-scale implementation.

Drawing from IBM's legacy of managing information, IBM DB2 Digital Library has developed a unique architecture for managing the storage of objects. At the core of the IBM DB2 Digital Library storage and management infrastructure is a library server which manages catalog information and provides pointers to the objects held in the collection. Object servers contain the actual digitize content files of a digital library, such as a video clip. The client (or end user) receives a direct path to the information requested from the collection while the data contained in the digital library is protected from random user access. With this triangle architecture the library server prevents unauthorized people from getting to the object servers. The data for digitized images, music and video tends to be large. Storing frequently used objects close to their users reduces communication costs and improves performance since the number of times the object is relayed is minimized.

In an IBM DB2 Digital Library solution, objects may be prestored and retrieved upon request. IBM DB2 Digital Library solutions provides an open set of application interfaces for access to servers, interaction with servers and the delivery of objects to clients. Objects can be delivered directly to a client so that a file is placed on a workstation ready for reuse. In addition, objects can be delivered and launched at the client level, so that, for example, a text object that's delivered in WordPerfect format is activated in Word-Perfect on the user's desktop. Likewise, a graphical image in Lotus Freelance can be activated in Lotus Freelance on the user's desktop.

IBM DB2 Digital Library provides for hierarchical storage management. Digital objects can be stored where people want them. High profile objects that are most likely to be accessed often may be stored on spinning disk, while objects less likely to be accessed are migrated off to tape or optical storage. The result is cost savings in storage maintenance. IBM DB2 Digital Library is open to a wide range of storage devices to ensure delivery of information on demand.

The cost of converting source materials into digital information means the storage architecture of IBM DB2 Digital Library must withstand the rigors of time and continuous use. Only IBM can boast the legacy of reliability and system stability that all digital libraries need to insure against the catastrophe that any breakdown would surely cause.

After defining the scope of a digital library, a user should consider the Search & Access functions that allow users to quickly and conveniently find the information they need.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of tracking items in a computer, the items being stored in a multi-media data store connected to the computer, the method comprising the steps of:

invoking a workflow agent; and under control of the workflow agent, monitoring an item in the multi-media data store to determine whether the item meets one or more specified conditions;

when the monitoring indicates that the item meets the one or more specified conditions, determining whether an action is to be performed; and when it is determined that an action is to be performed, performing the action.

2. The method of claim 1, wherein the step of monitoring further comprises the step of comparing a condition pattern to a result pattern.

3. The method of claim 2, wherein the condition pattern identifies a document and conditions to be monitored for the identified document.

4. The method of claim 3, wherein the result pattern is derived by checking the item for conditions indicated in the condition pattern.

5. The method of claim 4, further comprising the step of determining that the item meets the one or more specified conditions by comparing the condition pattern and the result pattern.

6. The method of claim 1, further comprising the step of monitoring the item at intervals.

7. The method of claim 1, wherein the workflow agent is invoked from an application, further comprising the step of providing event notification to the application.

8. The method of claim 7, wherein the event notification is implicit.

9. The method of claim 7, wherein the event notification is explicit.

10. The method of claim 7, wherein the event notification is provided after the action is started.

11. The method of claim 7, wherein the event notification is provided after the action is completed.

12. An apparatus for tracking items in a computer, comprising:

a computer having a multi-media data store connected thereto, wherein the data store stores the items;

one or more computer programs, performed by the computer, for invoking a workflow agent and under control of the workflow agent, monitoring an item in the multi-media data store to determine whether the item meets one or more specified conditions, when the monitoring indicates that the item meets the one or more specified conditions, determining whether an action is to be performed, and when it is determined that an action is to be performed, performing the action.

13. The apparatus of claim 12, wherein the means for monitoring further comprises the means for comparing a condition pattern to a result pattern.

14. The apparatus of claim 13, wherein the condition pattern identifies a document and conditions to be monitored for the identified document.

15. The method of claim 14, wherein the result pattern is derived by checking the item for conditions indicated in the condition pattern.

16. The method of claim 15, further comprising means for determining that the item meets the one or more specified conditions by comparing the condition pattern and the result pattern.

17. The method of claim 12, further comprising the step of monitoring the item at intervals.

18. The method of claim 12, wherein the workflow agent is invoked from an application, further comprising the step of providing event notification to the application.

19. The method of claim 18, wherein the event notification is implicit.

20. The method of claim 18, wherein the event notification is explicit.

21. The method of claim 18, wherein the event notification is provided after the action is started.

22. The method of claim 18, wherein the event notification is provided after the action is completed.

23. An article of manufacture comprising a computer program carrier readable by a client computer and embodying one or more instructions executable by the client computer to perform method steps for tracking items in a computer, the items being stored in a multi-media data store connected to the computer, the method comprising the steps of:

invoking a workflow agent; and under control of the workflow agent, monitoring an item in the multi-media data store to determine whether the item meets one or more specified conditions;

when the monitoring indicates that the item meets the one or more specified conditions, determining whether an action is to be performed; and when it is determining that an action is to be performed, performing the action.

24. The article of manufacture of claim 23, wherein the step of monitoring further comprises the step of comparing a condition pattern to a result pattern.

25. The article of manufacture of claim 24, wherein the condition pattern identifies a document and conditions to be monitored for the identified document.

26. The article of manufacture of claim 25, wherein the result pattern is derived by checking the item for conditions indicated in the condition pattern.

27. The article of manufacture of claim 26, further comprising the step of determining that the item meets the one or more specified conditions by comparing the condition pattern and the result pattern.

28. The article of manufacture of claim 23, further comprising the step of monitoring the item at intervals.

29. The article of manufacture of claim 23, wherein the workflow agent is invoked from an application, further comprising the step of providing event notification to the application.

30. The article of manufacture of claim 29, wherein the event notification is implicit.

31. The article of manufacture of claim 29, wherein the event notification is explicit.

32. The article of manufacture of claim 29, wherein the event notification is provided after the action is started.

33. The article of manufacture of claim 29, wherein the event notification is provided after the action is completed.

* * * * *